United States Patent
Baker et al.

[11] Patent Number: 5,149,584
[45] Date of Patent: Sep. 22, 1992

[54] CARBON FIBER STRUCTURES HAVING IMPROVED INTERLAMINAR PROPERTIES

[76] Inventors: R. Terry K. Baker; Nelly M. Rodriguez, both of 86 Lee Rd. - 827, Opelika, Ala. 36801

[21] Appl. No.: 602,182

[22] Filed: Oct. 23, 1990

[51] Int. Cl.⁵ .............................................. B32B 5/06
[52] U.S. Cl. .................................. 428/297; 428/397; 428/408; 428/902
[58] Field of Search ............... 428/408, 902, 297, 397; 501/99

[56] References Cited

U.S. PATENT DOCUMENTS 4,663,230  5/1987  Tennent .............................. 428/376

Primary Examiner—James J. Bell

[57] ABSTRACT

A carbon fiber structure suitable for use in high performance composites which structure is characterized by a primary carbon fiber structure having carbon filaments grown therefrom, wherein substantially all of the filaments are in the form selected from branched, spiral, helical, or a combination thereof. The carbon filaments are grown from the carbon fibers by use of an alloy catalyst comprises of a first metal selected from Group IB of the Periodic Table of the Elements, and one or more metals from a second group of metals selected from iron, nickel, cobalt, and zinc; and optionally a metal from a third group of metals selected from titanium, tungsten, tin and tantalum.

6 Claims, 2 Drawing Sheets

CARBON FIBER STRUCTURES HAVING IMPROVED INTERLAMINAR PROPERTIES

FIELD OF THE INVENTION

The instant invention relates to novel carbon fiber structures having improved interlaminar properties which are suitable for use as reinforcing materials in composites. The carbon fiber structures are comprised of a parent carbon fiber with carbon filaments grown therefrom. The carbon fiber structures of this invention are preferably prepared by use of an alloy catalyst containing at least one Group IB metal.

BACKGROUND OF THE INVENTION

The superior mechanical and strength-to-weight properties of carbon fibers has led to an important class of high performance fiber/matrix composites. These high performance composites are particularly useful for the production of aircraft and automobile body parts for which both strength and light weight are critical. Such composites enable manufacturers to produce relatively light weight structures without sacrificing strength. Consequently, much research has been directed to producing carbon fiber materials with ever increasing high performance properties and physical features that make them more valuable in commercial products and processes.

Various processes have been developed over the years for the production of high performance carbon fiber materials. One of the leading processes for producing high performance carbon fibers is the so-called PAN process wherein polyacrylonitrile (PAN) is used as a precursor fiber. The PAN process typically starts with a highly prestretched PAN fiber and consists of three steps. The first step is a stabilization treatment wherein the PAN fiber is heat treated in air at a temperature from about 200° to 300° C. for one or more hours. In the second step, the fiber is carbonized at a temperature above about 1100° C. in a non-oxidizing atmosphere. The third step consists of a post heat treatment at temperatures up to about 2500° C. to graphitize the fiber and give it its high performance properties. It is in this post heat treatment step that the chemical composition, the crystalline structure, and the mechanical properties, are strongly influenced.

Another method for producing high performance carbon fibers is referred to as the "ex-mesophase" method wherein pitch is spun into thread, then oxidized, carbonized, and graphitized. See for example French Patent No. 2,512,076.

High performance carbon fibers can also be prepared by a vapor-deposition method in which the fibers are produced by the thermal decomposition of a hydrocarbon on a substrate on which catalyst particles have been deposited. The catalyst particles are typically discrete particles of such metals as iron, cobalt, or nickel. One such vapor-deposition method teaches that carbon filaments are grown by exposing catalytic particles to a carburizing atmosphere. This is followed by exposing the filaments to an atmosphere whose carburizing potential is sufficiently high to deposit carbon from the vapor phase and thicken the filaments into a more longer and thicker fiber. See G. G. Tibbetts "Vapor-Grown Carbon Fibers", Carbon Fibers Filaments and Composites, edited by J. L. Figueiredo et. al., NATO ASI Series E: Applied Sciences, pages 73-94, Vol 177, 1989.

While high performance carbon fibers have met with a degree of commercial success as reinforcing materials in fiber/matrix composites, they nevertheless suffer from, inter alia, delamination problems. Several attempts have been made to modify carbon fibers to improve their interlaminar properties. For example, U.S. Pat. No. 4,816,289 teaches a method of producing crimped fibers. While crimped fibers have improved interlaminar properties, they would nevertheless still suffer from an unacceptable degree of delamination.

Another process teaches the formation of graphite fibers onto which secondary silicon carbide whiskers can be grown. While such a structure would show a substantial improvement in interlaminar shear strength, they unfortunately suffer from a number of shortcomings. For example, the silicon carbide whiskers are formed as only single non-branched structures. That is, there is no branching of the whiskers themselves, nor are the whiskers in a spiral or helical form. The carbon filaments which are produced on the carbon fibers in the practice of the present invention are branched, spiral, helical, or a combination thereof. These branched, spiral, and helical filament forms enhance interlocking of the fibers in the matrix. Furthermore, in the production of silicon carbide whiskers, relatively high temperatures (i.e., >1000° C.) are required. Still further, silicon carbide is intrinsically abrasive and thus leads to handling and processing problems. Other shortcomings include: (a) the thermal expansion coefficient of silicon carbide differs from that of carbon, and as a consequence, can initiate or propagate cracks in the resulting composite; (b) the densities of silicon carbide whiskers (ca. 3.22 g/cc) are considerably higher than those of carbon (2.25 g/cc); (c) at present, it is not possible to control silicon carbide whisker orientation and growth characteristics; and (d) the costs associated with producing secondary silicon carbide whiskers on carbon fibers is considerable. It is also believed that the bonding between the silicon carbide whiskers and the parent carbon fibers is non-chemical and thus would not be as strong as desired in certain applications.

Another process variation is taught in Sekiyu Gakkaishi, 28(5), 409-412, Egashira et. al, 1985, wherein carbon whiskers are grown on carbon fibers from the vapor phase catalyzed by iron sulfide. For example, the parent fibers are preoxidized with $HNO_3$ at a temperature of about 120° C. for one hour to facilitate supporting Fe on them. They are then impregnated with a 0.5 mol/L $Fe(NO_3)_3$ solution, followed by reduction with hydrogen. A mixture of benzene, $H_2S$, and $H_2$ are employed as the reactant gas. The whiskers, or filaments, produced are straight, non-branched filaments. That is, they cannot be characterized as being branched, spiral, or helical, as are the filaments of the present invention.

While the such methods of modifying carbon fibers do improve the interlaminar shear strength of the parent fibers to various degrees, there still exists a need in the art for high performance carbon fiber materials and structure with ever improved interlaminar properties and more economical ways of producing them.

SUMMARY OF THE INVENTION

In accordance with the present invention, there is provided an improved high performance carbon fiber structure comprised of a primary structure of carbon fiber having grown therefrom carbon filaments, wherein substantially all of said filaments form are in a form selected from branched, spiral, helical, or a combination thereof.

In a preferred embodiment of the present invention, the structure has an average crystallinity greater than about 50%.

In another preferred embodiment of the present invention, the filaments are predominantly spiral and/or helical in shape.

In still other preferred embodiments of the present invention, the filaments are predominantly branched.

In yet other preferred embodiments of the present invention, the substrate, instead of being a carbon fiber structure, is selected from the group consisting of alumina, silica, silicon carbide, silicon nitride, and the like.

Also disclosed is a method of preparing such carbon fiber structures, which method comprises: (a) depositing, on a carbon fiber substrate, a catalyst comprised of a metal alloy in which one of metals is a metal from Group IB of the Periodic Table of the Elements, and a second metal selected from the group consisting of Fe, Ni, Co, and Zn, wherein the Group IB metal is present in the alloy in an amount ranging from about 5 to 95 atomic percent (at. %), (b) subjecting the catalyst-treated carbon fiber substrate to a carbon containing gas at a temperature from the decomposition temperature of the carbon containing gas to the deactivation temperature of the catalyst, for an effective amount of time.

In preferred embodiments of the present invention, the Group IB metal is Cu and a third metal is present and is selected from the group consisting of Ti, W, Sn and Ta, which metal is substituted for up to about 10 at. % of the second metal.

In still other preferred embodiments of the present invention, the catalyst is comprised of a Cu/Ni or Cu/Fe alloy.

DETAILED DESCRIPTION OF THE INVENTION

Figure 2:
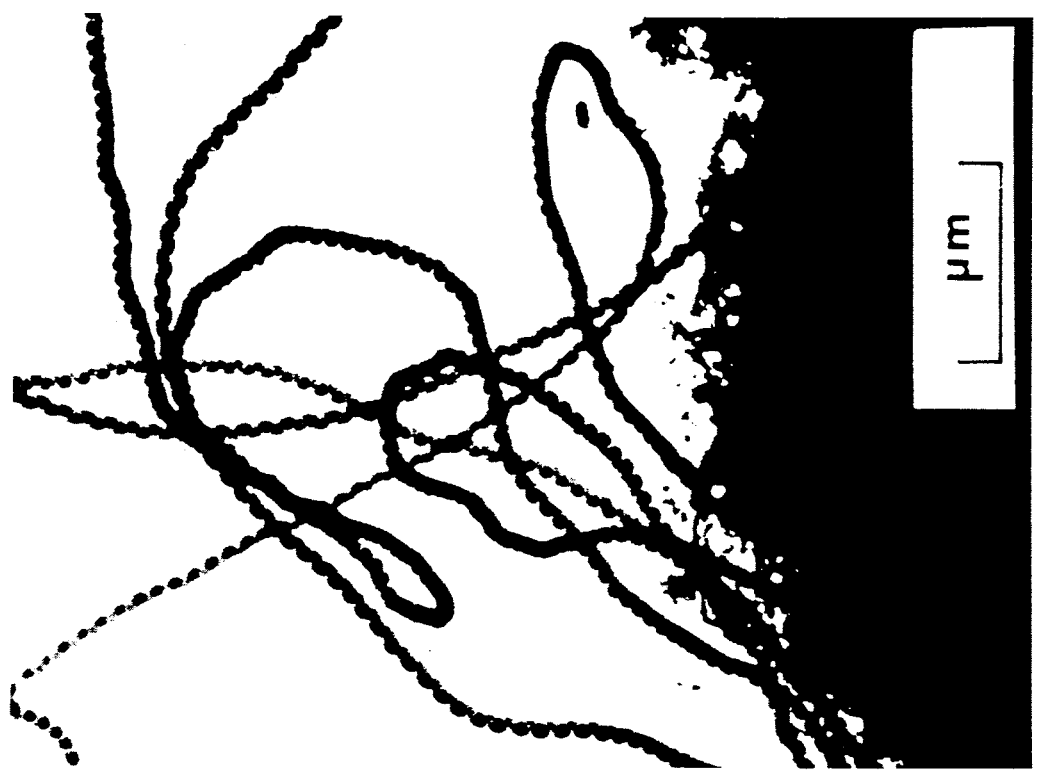
FIG. 2 is a photomicrograph of carbon filaments of the present invention grown with an alloy catalyst comprised of about 5 at. % Cu and 95 at. % Ni. The filaments are predominantly spiral.
Figure 1:
FIG. 1 is a photomicrograph of carbon filaments of the present invention grown with an alloy catalyst comprised of about 50 at. % Cu and 50 at. % Ni. The filaments are predominantly branched.
Figure 3:
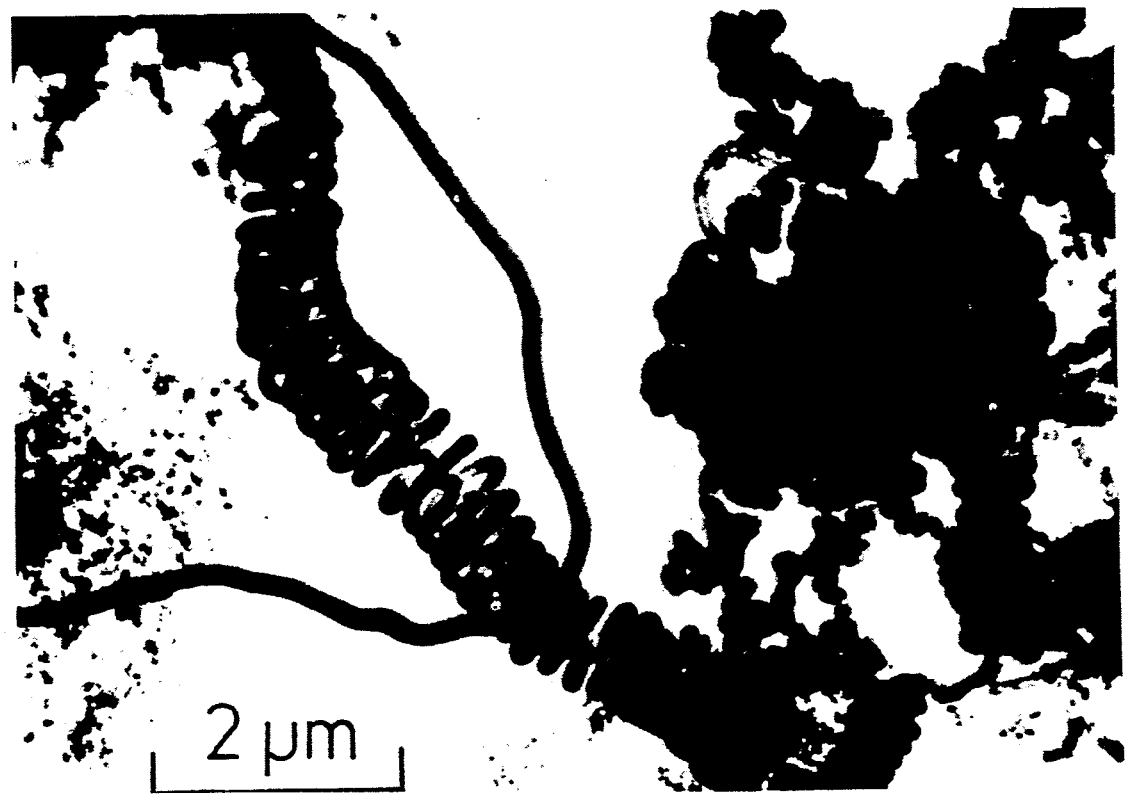
FIG. 3 is a photomicrograph of carbon filaments of the present invention grown with an alloy catalyst comprised of about 75 at. % Cu and 25 at. % Ni. The filaments are predominantly helical in form.

Carbon fibers suitable for use in the present invention include any of the high performance carbon fibers suitable for use as reinforcing materials for composites in which the matrix material is a plastic, carbon, or the like. Suitable carbon fibers include those prepared by any appropriate conventional method. Non-limiting methods for producing such fibers include the so-called PAN method, the ex-mesophase method, and the vapor-deposition method. Of course, any other appropriate method for producing such fibers can be used.

High preformance fibers are sometimes referred to by type. For example, HT-type carbon fibers generally have a tensile strength above 3000 MPa and a ratio of strength to stiffness of about 1.5 to 2%. This type of fiber is sometimes not referred to as a carbon fiber because it consists of high carbonaceous polyheteroaromatics with up to 7% nitrogen. Another type of carbon fiber is the HM-type which consists of pure carbon and which generally has a modulus of elasticity value, in the fiber direction, larger than about 30% of the elastic number $C_{11}$ of a graphite single crystal, but with a ratio of tensile strength to tensile modulus below 1%. Furthermore, they are generally commercially available with a modulus up to about 500 GPa, but can be cultivated to even higher stiffness; however, the strength is mostly limited to values below about 3000 MPa. Another type of carbon fiber is the HF-type which has a relatively high tensile strength, generally above about 3000 MPa, with a modulus which does not exceed about 250 GPa. It has recently been found that intermediate types (IM) can be produced with the high strength of the HF-type, but with a Young's modulus of up to about 350 GPa.

It is to be understood that substrate materials other than carbon fibers can be used in the practice of the present invention to grow filaments therefrom. Non-limiting examples of such other substrates include alumina, silica, silicon carbide, and silicon nitride.

Catalysts suitable for use in the practice of the present invention for growing carbon filaments from the surface of the carbon fibers are alloys comprised of a first metal selected from the metals of Group IB of the Periodic Table of the Elements, with a second metal selected from the group consisting of Fe, Ni, Co, Zn, or mixtures thereof. Group IB metals are Cu, Ag, and Au. Preferred are Cu and Ag with Cu being the most preferred. The Group IB metals is present in an amount ranging from about 5 to 95 at. %. A third metal may also be present and is selected from the group consisting of Ti, W, Sn and Ta. When a third is present, it is substituted for up to about 10 at. %, preferably up to about 5 at. %, of the second metal. It is preferred that the catalyst be comprised of copper alloyed with Ni or Fe. More preferred is copper alloyed with Fe and Ni from an economic point of view. That is, an alloy in which Fe is used in place of some of the Ni would be less expensive than an alloy comprised of Cu alloyed only with Ni.

The structural forms of the filaments grown on the carbon fibers can be controlled to a limited degree by the practice of the present invention. For example, use of a catalyst having a high copper content will generate predominantly helical filaments having a relatively low crystallinity. By high copper content we mean an alloy containing from about 70 to 95 at. % copper, based on the total weight of the alloy. Lower concentrations of copper, e.g., 5 to 30 at. % have a tendency to produce spiral and branched filaments, whereas an alloy with about 50 at. % copper will produce predominantly branched filaments. While filaments produced in accordance with the present invention will always contain a certain percentage of spiral and helical forms, branched filaments are preferred. Branched filaments are preferred because of the hooking nature of the branches for holding the fiber structure securely in the matrix. Also, by predominantly, or substantially all spiral, helical, and/or branched, as used herein, means that after filament growth, there are no more than about 20%, preferably no more than about 10%, and more preferably no more than about 5 wt. % of straight filaments among the spiral, helical and branched filaments.

The alloy catalyst can be deposited onto the carbon fibers by any appropriate technique. Non-limiting examples of such techniques include incipient wetness techniques, as well as vaporization techniques. A typical incipient wetness technique includes dissolving salts of each metal of the alloy in an appropriate solvent, then impregnating the carbon fibers with the salt solution. The impregnated fibers are then dried at a temperature greater than 100° C., preferably from about 105° C. to about 120° C., and more preferably at about 110° C. After drying they are calcined at a temperature from about 200° to 300° C., preferably from about 200° to about 250° C., thereby converting the individual metals to their respective oxide form. The so treated fibers are then heated, in a hydrogen containing atmosphere, at a temperature from about 400° to about 600° C., preferably from about 450° to 550° C., for an effective amount of time, to produce the catalyst in an alloy form. By effective amount of time, we mean that amount of time needed to reduce substantially all of the metal oxides to the respective alloy having a suitable particle size. Suitable particle sizes are from about 25 Å to about 1500 Å, preferably from about 50 Å to about 1000 Å, and more preferably from about 400 Å to about 600 Å.

Metal salts suitable for use in the present invention are salts which are soluble in water, as well as in organic solvents. Non-limiting examples of water soluble salts suitable for use herein include nitrates, sulfates and chlorides. Non-limiting examples of salts soluble in organic solvents, which are suitable for use herein include formates, acetates, and oxalates. Preferred are the organic soluble salts because the carbon fibers would not have to pretreated. Non-limiting examples of organic solvents which are suitable for use herein include alcohols, such as methanol, ethanol, propanol, and butanol; ketones, such as acetone; acetates and esters; and aromatics, such as benzene and toluene.

When an aqueous solution of metal salt is used, it is preferred that the surface of the carbon fibers be pretreated to make the surface more acceptable to the catalyst. One preferred method of pretreating the carbon fibers is to oxygenate the fiber surface using atomic oxygen, or a compound that will produce atomic oxygen in a plasma. Although an oxidizing agent, such as nitric acid, can also be used, it is not preferred because it would have a tendency to oxygenate only the defect sites of the surface instead of oxygenating substantially the entire surface as atomic oxygen would. The surface is preferably treated with atomic oxygen for an effective amount of time, at about room temperature (about 22° C.). By effective amount of time, we means for that amount of time, preferably for that minimum amount of time, needed to oxygenate substantially all of the surfaces of the carbon fibers.

If a vaporization technique is used to deposit the alloy catalyst, volatile metal salts, such as carbonyls, or the elemental metal, is used. Vaporization can be accomplished by any appropriate technique, such as vapor deposition or electrolytically.

After the alloy catalyst is present on the carbon fiber structure in its alloy particulate form, the fiber structure is treated in such a way as to grow filaments from the carbon fibers. This can be done by passing the catalyst-containing fiber structure through a heating zone for an effective amount of time, said heating zone containing the vapor of a suitable carbon-containing compound. By an effective amount of time we mean for that amount of time needed to produce the desired filament structural arrangement. This amount of time will generally be from about 10 minutes to about 8 hours, preferably from about 10 minutes to about 6 hours, more preferably from about 15 minutes to 2 hours, and most preferably from about 15 minutes to about 1 hour. The heating zone is maintained at a temperature from the decomposition temperature of the carbon-containing compound to the deactivation temperature of the alloy catalyst. Generally, this temperature will range from about 500° C. to about 700° C., preferably from about 550° C. to about 650° C., and more preferably from about 550° to about 650° C. Carbon-containing compounds suitable for use in the practice of the present invention are compounds composed mainly of carbon atoms and hydrogen atoms, although carbon monoxide may also be used. The carbon-containing compound, which may be introduced into the heating zone in gaseous form, preferably has no more than 8 carbons, preferably no more than 6 carbon atoms, more preferably no more than 4 carbon atoms, and most preferably no more than 2 carbon atoms. Non-limiting examples of such compounds include CO, ethane, ethylene, acetylene, propane, propylene, butane, butene, butadiene, pentane, pentene, cyclopentadiene, hexane, cyclohexane, benzene, toluene. Most preferred is ethylene.

It may be desirable to have an effective amount of hydrogen present in the heating zone. By an effective amount, we mean that minimum amount of hydrogen which will maintain a clean catalyst (free of carbon residue), but not so much that will cause excessive hydrogasification, or burn-off, of carbon from the filaments and/or fiber structure. Generally, the amount of hydrogen present will range from about 5 to 40 vol. %, preferably from about 10 to 30 vol. %, and more preferably from about 15 to 25 vol. %. Hydrogen serves two competing functions. For example, on the one hand it acts as a cleaning agent for the catalyst, but on the other hand it hydrogasifies, or causes carbon burn-off, of the carbon structure. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone. That is, a catalyst system, such as Cu:Ni is so active that it utilizes essentially all of the carbon deposited thereon to grow filaments, and thus, there is generally no carbon residue to clean off.

After the filaments are grown from the carbon fibers, it will be desirable to treat the final structure with an aqueous solution of an inorganic acid, such as a mineral acid, to remove any excess catalyst particles. This is particularly desirable when the final structure is going to be used in a composite where carbon, typically in the form of pitch, is used as the matrix. Non-limiting examples of mineral acids which can be used to treat the final structure include sulfuric acid, nitric acid, and hydrochloric acid. Preferred is sulfuric acid.

It is not necessary to use carbon fibers which have been first graphitized. That is, non-graphitized carbon fibers may be used and after the carbon filaments have been grown therefrom, the entire structure can then be graphitized. This can result in more highly graphitized filaments. The entire structure can be graphitized by heating the structure in an inert atmosphere, preferably argon, at a temperature of about 2500° C. for enough time to cause the structure to become graphitized. It is preferred that the carbon structure have a crystallinity greater than about 25%, more preferably greater than about 50%, and most preferably greater than about 75%. Crystallinities greater than about 80% and 90% are also preferred, particularly crystallinities up to about to about 100%. Crystallinity can be measured by any appropriate technique. Such techniques include resistivity, as set forth in Example 5 hereof, and oxidation measurements, as set forth in Example 6 hereof. Such techniques are well known to those skilled in the art and further elaboration is not needed for the purposes of the present invention.

The carbon fibers may be present in any appropriate geometric arrangement. The geometric arrangement will generally depend on the intended use of the final composite. For example, the fibers may be arranged so as to form a unidirectional composite. Unidirectional composites are made by aligning fiber bundles in a mold, impregnating the fibers with a matrix component, compacting them while squeezing out excess matrix component, then curing the matrix component. Such simple molding techniques are rarely used in large-scale production because of difficulties in maintaining uniformity of the matrix component and alignment of the fibers. The most common way of handling carbon fibers in a commercial environment is in pre-preg form. A pre-preg is typically a sheet of carbon fibers impregnated with uncured matrix component which has well-controlled thickness, fiber loading, and fiber alignment. The orientation of the fibers in each layer can be chosen in order to provide the desired mechanical characteristics of the final sheet. Other techniques for forming composites include filament winding and pultrusion. In pultrusion, a matrix impregnated fiber is continuously pulled through a hot dye which continuously cures the matrix. The carbon fibers can also be used as carbon fabrics in both woven and non-woven form which are suitable in the fabrication of sheet materials.

The matrix component employed in the practice of the present invention can be any of the plastics suitable for use in high performance carbon fiber/matrix composites. Non-limiting examples of plastics which can be used include thermosetting resins, such as the epoxies, thermoplastic polymers, and modified matrix resins. Typically, thermoplastic polymers are more advantageous to process and they generally show much higher toughness than composites containing brittle thermosetting resins. Typical thermoplastic resins include epoxy bismaleimides, polyamide-imide(PAI), polyphenylene sulfide(PPS), polysulfone(PS), polyethesulfone(PES), polyetherimide(PEI), polyetheretherketone(PEEK), and polytetrafluoroethylene (PTFE). However, some properties show disadvantages, such as creep resistance which reduces dynamic loading. This is due to the cross-linked nature of the linear thermoplastic polymer. In addition, pitch derived from petroleum, coal, or any other suitable organic precursor molecules, or extracted therefrom can be used as the matrix component. The resulting composite would then be referred to as a carbon-carbon composite.

The invention will be illustrated in more detail with reference to the following examples, which should not be construed to be limiting in scope of the present invention.

EXAMPLE 1

A series of runs were conducted using 100 mg samples of a copper:nickel alloy powder (Cu:Ni ratio 3:7). Each sample was placed in a two inch diameter fused silica reactor tube at room temperature (about 22° C.) and then heated to a temperature of 350° in a 10% hydrogen/helium mixture at a flow rate of 100 standard cubic centimeters per minute (sccm) in a clam shell type electric furnace. These conditions were maintained for 30 minutes at which time the hydrogen flow was cut-off and the sample brought to the desired reaction temperature in the presence of helium alone. Upon reaching the desired reaction temperature, the helium was replaced by a flow of ethylene (100 sccm) and the reaction was allowed to proceed for 90 minutes. Following this procedure, ethylene was replaced by helium and the sample cooled to room temperature and reweighed to determine the amount of carbon produced. The weight changes of the samples are shown in Table I below.

TABLE I

| Effect of Temperature on Carbon Filament Formation From Interaction of Cu:Ni (3:7) with Ethylene | | |
|---|---|---|
| Sample | Temperature °C. | % Carbon Yield |
| a | 300 | 0 |
| b | 400 | 0 |
| c | 450 | 0 |
| d | 500 | 19 |
| e | 550 | 57 |
| f | 600 | 66 |
| g | 650 | 68 |
| h | 700 | 69 |
| i | 720 | 0 |
| j | 750 | 0 |

Subsequent examination of the carbon deposits in a scanning electron microscope showed that the carbon consisted entirely of filamentous form.

EXAMPLE 2

The experimental procedure of Example 1 was followed except that the composition of the copper:nickel alloy powders was varied from 80:20 to 0:100 and the reaction temperature maintained at 650° C. The weight changes due to carbon formation on the alloy powders are shown in Table II below.

TABLE II

| Effect of Catalyst Composition on the Production of Carbon Filaments | |
|---|---|
| Catalyst Composition Cu:Ni Ratio | % Carbon Yield |
| 80:20 | 9.8 |
| 70:30 | 59.6 |
| 50:50 | 71.0 |
| 30:70 | 69.2 |
| 20:80 | 63.7 |
| 10:90 | 54.3 |
| 0:100 | 31.1 |

EXAMPLE 3

The experimental procedure used in Example 1 was followed in all respects, except the reaction time was varied from 0.5 to 8 hours and the reaction temperature was maintained at 600° C. The weight changes due to carbon formation on the alloy powders are shown in Table III below.

TABLE III

| Effect of Reaction Time on Carbon Filament Yield | |
|---|---|
| Reaction Time (Hrs.) | % Carbon Yield |
| 0.5 | 59.5 |

TABLE III-continued

Effect of Reaction Time on Carbon Filament Yield

| Reaction Time (Hrs.) | % Carbon Yield |
|---|---|
| 1.0 | 67.3 |
| 1.5 | 66.0 |
| 2.0 | 62.4 |
| 3.0 | 58.7 |
| 4.0 | 56.9 |
| 5.0 | 57.8 |
| 6.0 | 56.1 |
| 8.0 | 50.2 |

EXAMPLE 4

In a series of comparison experiments, 100 mg of iron and nickel and various alloys of these metals were placed in the reactor system described in Example 1 and then initially heated in a 10% hydrogen/helium mixture (100 sccm) at 350° C. for 30 minutes. Following this treatment the samples were brought to a temperature of 600° C. in helium. The inert gas was removed from the system and the samples reacted in ethylene/hydrogen environment where the ratio of hydrocarbon/hydrogen was systematically varied from 100/0 to 10/90 for a constant reaction of 1.5 hours. The data obtained from these experiments is presented in Table IV.

TABLE IV

% Carbon Yield From Various Catalysts As a Function of Ethylene/Hydrogen Ratio

| Catalyst | 100:0 | 4:1 | 2:1 | 1:1 | 1:2 | 1:4 | 1:9 |
|---|---|---|---|---|---|---|---|
| Nickel | 0 | 1.7 | 7.4 | 44.2 | 32.8 | 31.6 | — |
| Copper-Nickel (3:7) | 74.3 | 66.5 | 65.5 | 57.9 | 42.3 | 26.8 | 17.1 |
| Copper-Nickel (1:1) | 69.6 | — | — | 62.7 | 53.2 | 26.8 | — |
| Iron | 0 | 0.2 | 0.5 | 1.0 | 1.5 | 2.0 | — |
| Copper-Iron (3:7) | 0 | 3.3 | 6.4 | 60.7 | 52.8 | 27.1 | — |
| Silver-Iron (3:7) | 1.0 | 39.0 | — | 40.3 | — | 51.9 | — |
| Nickel-Iron (8:2) | 62.3 | 67.3 | — | 70.8 | — | 66.1 | — |
| Nickel-Iron (1:1) | 1.0 | 4.0 | — | 16.9 | — | 50.2 | 51.2 |
| Nickel-Iron-Copper (7:12:1) | 64.1 | 63.4 | 68.4 | 68.6 | 65.7 | 63.3 | 44.6 |

EXAMPLE 5

Resistivity measurements of samples of carbon filaments prepared according to the procedure outlined in Example 1, were compared with those of other materials in an attempt to determine the graphitic nature of the filaments as a function of the catalyst composition. The relative values obtained are presented in Table V.

TABLE V

Comparison of the Electrical Resistivities Of Carbon With Various Cu/Ni Alloys

| ALLOY COMPOSITION Cu:Ni | RELATIVE RESISTIVITY ohms-cm |
|---|---|
| 0:100 | 4.43 |
| 5:95 | 4.25 |
| 10:90 | 3.65 |
| 20:80 | 3.27 |
| 30:70 | 4.02 |
| 85:15 | 6.75 |
| Graphite | 1.76 |
| Active Carbon (DARCO KB)* | $3.26 \times 10^3$ |
| Alumina | $4.2 \times 10^6$ |

*Active carbon available from Norit Carbon Co.

EXAMPLE 6

In another series of characterization studies, 50 mg of carbon filaments produced from various catalyst compositions were gasified in carbon dioxide using a thermogravimetric technique. Samples of carbon filaments were prepared as described in Example 1 and heated at a constant rate in carbon dioxide up to 1000° C. and changes in weight recorded as a function of reaction time. In a parallel set of experiments, samples of SP-1 graphite were also gasified in carbon dioxide using copper:nickel alloys of identical composition to that present in carbon filaments and were used as reference. SP-1 graphite is a spectrographically pure graphite available from Union Carbide Co. A synopsis of the data is given in Table VI.

TABLE VI

Reactivity of Carbon Filaments to $CO_2$ As a Function of Catalyst Composition

| Catalyst | Type of Carbon | 650 | 700 | 650 | 800 | 850 | 900 | 950 | 1000 |
|---|---|---|---|---|---|---|---|---|---|
| Ni | Filaments | 19.8 | 47.7 | 88.6 | 97.7 | | | | |
|  | Graphite | | | 15.5 | 53.6 | 88.7 | 97.4 | | |
| Cu:Ni (1:9) | Filaments | | | | 10.0 | 65.8 | 83.3 | 90.8 | |
|  | Graphite | | | | 26.3 | 51.6 | 78.9 | 92.7 | |
| Cu:Ni (2:8) | Filaments | | | | 7.7 | 46.2 | 63.8 | 80.0 | 93.7 |
|  | Graphite | | | | 7.4 | 21.3 | 42.6 | 70.2 | 88.3 |
| Cu:Ni (5:5) | Filaments | | | 2.9 | 6.7 | 17.3 | 41.3 | 72.1 | 88.5 |
|  | Graphite | | | | 6.5 | 16.2 | 30.3 | 50.3 | 67.6 |
| Cu:Ni (7:3) | Filaments | | 1.0 | 5.0 | 15.0 | 38.6 | 68.0 | 88.0 | |
|  | Graphite | | | | 2.0 | 2.5 | 3.0 | 7.2 | 14.4 |

From this data, we can conclude that filaments produced from copper:nickel alloys containing a high fraction of nickel exhibit gasification characteristics which are similar to that found in graphite, i.e. such filaments contain a large fraction of graphite.

EXAMPLE 7

In another series of experiments 5 wt. % of catalyst, consisting of various ratios of copper and nickel were deposited onto carbon fibers (T-300). This carbon fiber supported catalyst system was initially calcined in air at 300° C. for 0.5 hours and then reduced in hydrogen at 300° C. for 1 hour. Following this treatment the supported catalyst was reacted in the apparatus described in Example 1 in an ethylene/hydrogen (1:1) mixture at 600° C. for 2.0 hours after reaction the samples were cooled to room temperature in helium and the yield of carbon filaments formed in the parent fibers determined by weight difference, and the values recorded in Table VII.

TABLE VII

EFFECT OF CATALYST COMPOSITION ON THE PRODUCTION OF CARBON FILAMENTS ON CARBON FIBERS

| Catalyst Composition Cu:Ni Ratio | Grams of Carbon Deposited |
| --- | --- |
| 80:20 | 0.017 |
| 50:50 | 0.225 |
| 20:80 | 0.460 |
| 10:90 | 0.502 |
| 0:100 | 0.355 |

EXAMPLE 8

Samples were produced in a similar manner to that described in Example 8 except that the catalyst composition was maintained constant at copper:nickel (3:7) and the formation of filaments was examined as a function of the carbon fiber type. The results are condensed in Table VIII.

TABLE VIII

| Carbon Fiber* | Young Modulus | Grams of Carbon Deposited |
| --- | --- | --- |
| P-25 | 150 | 0.529 |
| T-300 | 231 | 0.496 |
| T-50 | 379 | 0.527 |
| P-55 | 380 | 0.548 |
| P-75 | 517 | 0.491 |
| P-100 | 690 | 0.505 |
| P-120 | 820 | 0.464 |

*These carbon fibers are available from Amoco Chemical Co. under the designations set forth in this column.

What is claimed is:

1. A high performance composite material comprised of: (a) a carbon fiber structure comprised of a primary structure of carbon fibers having grown therefrom, carbon filaments, which structure is characterized as: (i) having a crystallinity greater than about 75%; and (ii) having substantially all of the filaments in a form selected from branched, spiral, helical, or a combination thereof; and (b) a matrix material selected from plastics and carbon.

2. The composite material of claim 1 wherein the carbon fiber structure is substantially all graphitic.

3. The composite material of claim 2 wherein the matrix material is carbon.

4. The composite material of claim 2 wherein the matrix material is a thermoplastic or thermosetting plastic.

5. The composite material of claim 4 wherein the plastic is a themoplastic selected from the group consisting of polytetrafluoroethylene and polyetheretherketone.

6. The composite material of claim 4 wherein the plastic is a thermosetting plastic selected from the epoxies, polyamideimide, polyphenylene sulfide, polysulfone, polyethesulfone, polyetherimide, and polyetheretherketone.

* * * * *